United States Patent [19]

Karte et al.

[11] Patent Number: 5,644,948
[45] Date of Patent: Jul. 8, 1997

[54] CONTROL VALVE WITH A DRIVE OPERATED BY A PRESSURE MEDIUM AND A POSITION CONTROLLER

[75] Inventors: Thomas Karte, Lemgo; Heiko Kresse, Insernhagen; Alexander Kleist; Wolfgang Backe, both of Aachen, all of Germany

[73] Assignee: Mannesmann Aktiengesellschaft, Dusseldorf, Germany

[21] Appl. No.: 459,492

[22] Filed: Jun. 2, 1995

[30] Foreign Application Priority Data

Jun. 2, 1994 [DE] Germany .......................... 44 20 393.4
Dec. 7, 1994 [DE] Germany .......................... 44 45 058.3

[51] Int. Cl.$^6$ .................................................. G01N 19/02
[52] U.S. Cl. .................................................. 73/168; 73/9
[58] Field of Search ...................... 73/168, 7, 9; 137/551

[56] References Cited

U.S. PATENT DOCUMENTS

| 4,029,122 | 6/1977 | Jaegtnes | 73/9 |
| 4,274,438 | 6/1981 | La Coste . | |
| 4,523,286 | 6/1985 | Koga et al. . | |
| 4,976,144 | 12/1990 | Fitzgerald | 73/168 |
| 5,197,328 | 3/1993 | Fitzgerald | 73/168 |
| 5,365,769 | 11/1994 | Ferry | 73/168 |
| 5,487,302 | 1/1996 | Casada et al. | 73/168 |

FOREIGN PATENT DOCUMENTS

| 37 27 008 A1 | 2/1989 | Germany . |
| 42 33 301 | 2/1994 | Germany . |
| 94/28341 | 12/1994 | WIPO . |

*Primary Examiner*—William A. Cuchlinski, Jr.
*Assistant Examiner*—Andrew Hirshfeld
*Attorney, Agent, or Firm*—Cohen, Pontani, Lieberman, Pavane

[57] ABSTRACT

An apparatus and process for monitoring conditions of a control valve including a valve element operated by a drive controlled by a position controller. A spindle extends into a valve chamber through a dynamic seal and connects the valve element to the drive. The condition of the seal is monitored by measuring start-up time, stopping time and distance travelled. The start-up time relates to the time between application of control current to the position controller and sensing movement of the valve element. The stopping time relates to the interval between application of a second control current to the position controller and sensing the valve element has stopped. The distance travelled relates to distance the valve element travels during the stopping time. A time difference is determined by subtracting the stopping from the starting time and is calibrated to a seal coefficient of friction. The distance travelled is also calibrated to a seal coefficient of friction. These two coefficients of friction are compared whereby a discrepancy indicates a change in air pressure has occurred during valve operation. These measurements are taken prior to and cyclically during valve operation. The coefficient of friction obtained during valve operation is compared with the coefficient of friction obtained prior to valve operation to indicate a change in the condition of the seal. If a change in air pressure occurred during valve operation, the coefficient of friction obtained by calibrating the travel distance is compared with the coefficient of friction obtained prior to valve operation.

5 Claims, 2 Drawing Sheets

CONTROL VALVE WITH A DRIVE OPERATED BY A PRESSURE MEDIUM AND A POSITION CONTROLLER

BACKGROUND OF THE INVENTION

1. Field of the Invention

The present invention relates to a device and process for determining operating conditions of a control valve including a valve element operated by a pressure operated drive, the drive being controlled by a position controller and, more particularly, to a device and process for determining the condition of a seal at a point at which the valve element enters the valve chamber.

2. Description of the Prior Art

Control valves are well known in the art. For example, German Patent No. DE 42 33 301, which is incorporated in its entirety herein by reference, describes a control valve in which the position controller continuously monitors the operation of the valve. The system described by this patent includes a valve element, a pneumatic drive and a position controller. The pneumatic drive is connected to the valve element by a spindle and is also connected to the position controller. The drive moves the valve element which is located within a valve chamber via the spindle connection. The position controller controls the pneumatic drive and thus the movement of the valve element by supplying the drive with pressurized air as a correcting variable. The drive then moves the valve element via the spindle connection in response to receipt of the pressurized air. The correcting variable is supplied by the position controller in response to an electrical command signal of, for example, 4 to 30 mA received by the position controller. The position controller is also connected to the spindle and is able to determine the actual position of the valve element by sensing movement of the spindle. The position controller includes a sensor and built-in microprocessor serving exclusively to monitor the control performance of the valve. The movement sensed by the sensor is delivered to the microprocessor wherein the values received are integrated over time and compared with reference values to determine the control performance of the valve. Problems exist with such a device as, by in sensing only the valve movement to determine the control performance of the valve, many parameters, including mechanical parameters, influence the control performance of the valve and are not compensated for by such measurements.

At the entry point of the spindle into the valve chamber is a dynamic seal. This dynamic seal is often designed as a stuffing box. The seal must be absolutely tight and remain tight throughout operation of the valve. As this dynamic seal must remain tight it will exert a frictional force on the spindle thus hindering its movement and the movement of the valve element within the valve chamber. It is also very important to be able to monitor the condition of the seal. It is possible to monitor the condition of the seal by determining whether a change in the stuffing box frictional force upon the spindle has occurred.

Several attempts have been made determining this frictional force and whether a change in this force has occurred. In one instance a curve of the drive pressure has been plotted against the position of the spindle. The frictional force is then obtained by determining the hysteresis of the upward and downward movement of the spindle. Measurements taken in this manner require an additional sensor, namely a pressure sensor, in the drive which greatly increases both the power consumption and cost of the device. The additional power consumption needed by such devices is a critical factor due to the use of such valves in large chemical plants in which the amount of power consumption is highly regulated and in which there is a danger of explosions occurring during operation of the valves.

It is thus desirable to provide a control valve which does not require the high power consumption of the above mentioned valves and is also able to monitor the condition of the dynamic seal in an effective manner.

SUMMARY OF THE INVENTION

It is thus an object of the present invention to provide a method and apparatus for monitoring the condition of a dynamic seal of a control valve as part of the control process of this valve without an additional sensor.

It is a further object of the present invention to provide a method and apparatus for monitoring the condition of the dynamic seal of a control valve while maintaining low power consumption.

It is a still further object of the present invention to provide a method and apparatus for detecting changes in the air pressure occurring during operation of the pneumatic drive of this control valve.

The present invention relates to a control valve having a valve element which is driven by a pneumatic drive via a spindle. The spindle extends into a valve chamber and the valve element is positioned within the valve chamber. The pneumatic drive is controlled by a position controller which regulates a flow of pressurized air to the drive. The position controller includes an air intake port and an air exhaust port and is connected to the drive through a pressurized air duct. Upon receipt of a control signal of between 4 to 20 mA the position controller sends pressurized air as a correcting variable to the pneumatic drive thus causing the pneumatic drive to operate and effect the movement of the valve element. The position controller is connected to the spindle by a distance indicator for monitoring the movement of the spindle and thus the valve element through movement of the distance indicator.

A dynamic seal is formed by a stuffing box positioned at the point of entry of the spindle into the valve chamber. The stuffing box is positioned about the spindle. Monitoring of the condition of this seal formed by the stuffing box is very important as the seal must remain tight throughout operation of the valve. As this seal must remain tight the stuffing box will exert a frictional force on the spindle thus inhibiting its movement.

In order to monitor the condition of this seal the position controller includes a sensor which is connected to the distance indicator, a timer or counter and a microcomputer. Upon receipt of the electrical command current of from about 4 to 20 mA the timer or counter will be activated to measure a first interval. The receipt of the electrical command variable will also cause pressurized air to be delivered to the drive thus starting movement of the valve. In order for the valve element to begin movement it must overcome two frictional forces applied by the stuffing box. These frictional forces are the static frictional force which must be overcome to set the valve element in motion and a second gliding frictional force which must be overcome to maintain the valve element in motion. Once the sensor senses that the spindle has begun moving via the distance indicator it sends a signal to the counter thereby stopping the counter. The interval measured by the counter is called the start-up time. When a second electrical command current indicating that the movement of the valve element should be stopped is received by the computer the counter may be activated to decrement the value obtained during the first interval. The counter then is stopped again by receipt of a signal from the sensor indicating that the spindle and thus the valve element has stopped moving. This time is called the stopping time and is related to the time it takes the gliding frictional force to stop movement of the spindle. The decrementing of the counter during the stopping time results in a difference interval being obtained. The difference value is equal to the time difference between the starting time and stopping time and is directly related to the static frictional force of the stuffing box mentioned above. This difference value is then calibrated in the microprocessor through a relation with a coefficient of friction for the stuffing box. Various measurements are taken during an initial autoconfiguration run thereby calibrating the system and obtaining reference values or parameters. The coefficient of friction for the stuffing box obtained during operation of the control valve is then compared with the reference values. If there is a difference between these values a change in the friction of the stuffing box and thus a change in the condition of the seal has occurred.

As the air pressure may also change during movement of the valve element the distance the valve element travels during the stopping time is also measured as a distance measurement by the sensor. The distance travelled is not effected by a change in the air pressure. This measurement is then sent to the microprocessor where it is also calibrated through its relation with a coefficient of friction of the stuffing box. This coefficient of friction is then compared with the coefficient of friction obtained for the difference interval between the start-up time and the stopping time. If there is a difference between the compared coefficients a change in the air pressure has occurred. If a change in the air pressure has occurred then the coefficient of friction for the stuffing box obtained by calibrating the measured travel distance during the stopping time is used for comparison with the reference coefficient of friction. As this distance measurement is not effected by the change in pressure a comparison using this coefficient will give an accurate determination as to the condition of the seal.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings, where like reference numerals are used to identify identical components

DETAILED DESCRIPTION OF THE PREFERRED EMBODIMENTS

The present invention will now be described in more detail with reference to FIGS. 1 and 2.

Figure 1:
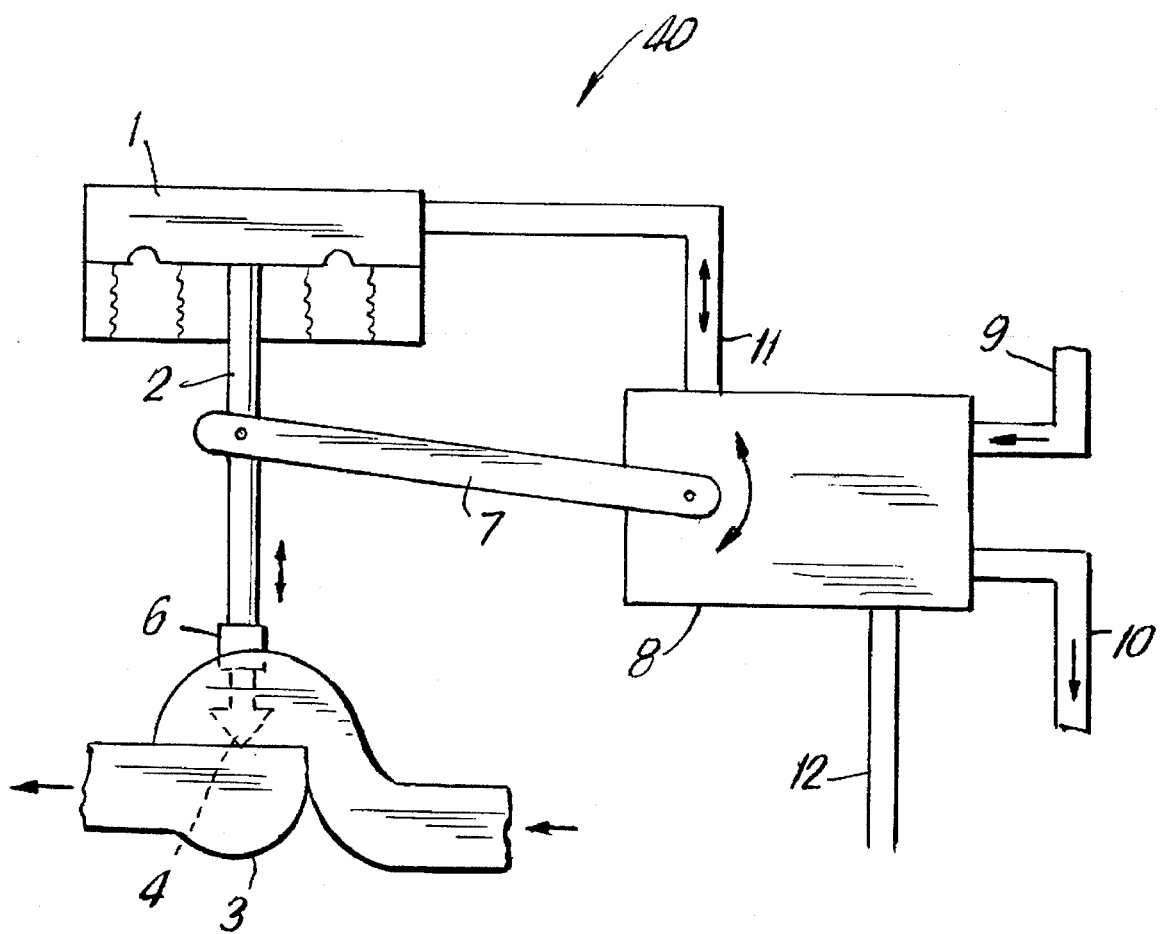
FIG. 1 is a side schematic view of the control valve of the present invention.

FIG. 1 shows a control valve in accordance with the present invention and is labelled generally by the numeral 40. The control valve 40 includes a valve element 4 connected to a drive 1 through a spindle 2. The valve element 4 is positioned within a valve chamber 3 and the spindle 2 extends into the chamber. The extent to which the spindle 2 extends into the chamber is controlled by the drive 1. The drive 1 is connected to and controlled by a position controller 8 through a pressurized air duct 11. The drive 1 may be any device suitable for driving the valve element 4 with a pneumatic drive being presently preferred.

The position controller 8 includes a pressurized air inlet port 9 and an air outlet port 10. The air inlet port 9 provides for ventilation for the drive 1. The air outlet port 10 provides for deventillation of the drive 1. The pressurized air outlet duct 11 supplies a correcting variable in the form of pressurized air to the drive 1 in accordance with an electrical command current received through an electrical input port 12 by the position controller 8. This command current is typically of a magnitude of from about 4 to 20 mA.

Coupled between the spindle 2 and the position controller 8 is a distance indicator 7. The distance indicator 7 is pivotally mounted on the position controller 8. As the spindle 2 and the valve element 4 are connected together, they are caused to move in unison when operated by the drive 1 thereby causing the distance indicator 7 to pivot about its pivot connection with the position controller 8 in accordance with the movement of the spindle 2 and valve element 4.

Positioned about the spindle 2 at the point at which it enters the valve chamber 3 is a stuffing box 6. The stuffing box 6 provides a dynamic seal about the spindle 2 thus seals the valve chamber 3 at the point of entry of the spindle 2. The dynamic seal formed by the stuffing box 6 must remain absolutely tight throughout the operation of the valve. As the stuffing box 6 creates a tight seal at the entry point of the spindle 2 it exerts frictional forces on the spindle 2 and thus inhibits the movement of both the spindle 2 and the valve element 4. In order for the valve element 4 to begin movement within the valve chamber 3 it must overcome the frictional forces exerted by the stuffing box 6. These forces include the static friction force to place the valve element 4 in motion and the gliding friction force needed to maintain the gliding motion of the valve element 4. When using a control valve such as that of the present invention it is important to constantly monitor the condition of the seal formed by the stuffing box 6 as degradation in the condition of the seal will effect the operation of the control valve.

Figure 2:
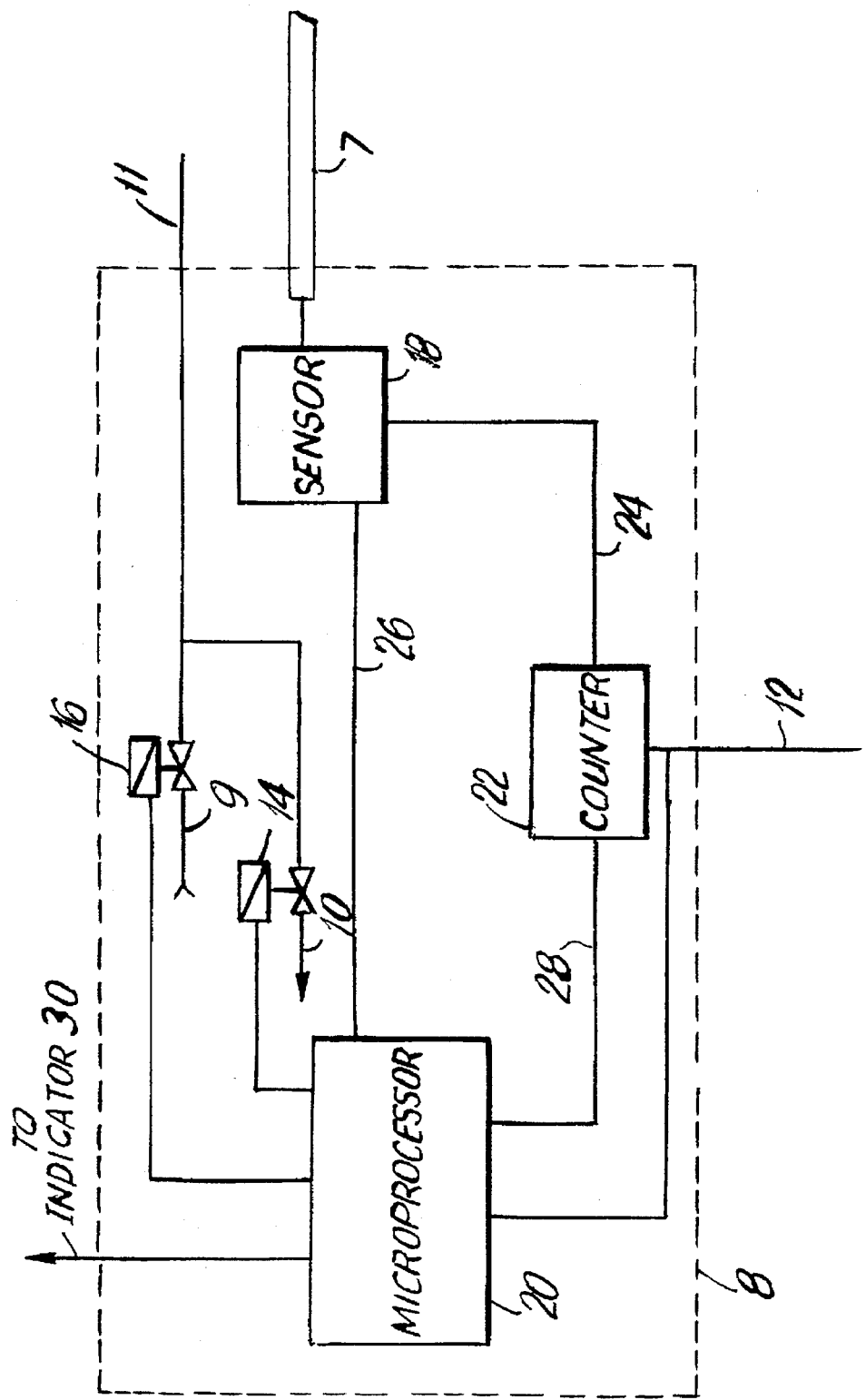
FIG. 2 is a block diagram of the position controller of the present invention.

The condition of the seal is monitored by the position controller 8 as can be more clearly seen in FIG. 2. The position controller 8 includes a microprocessor 20 and two valves 14,16, e.g. electromagnetic valves, which are coupled to receive the electrical control current of about 4 to 20 mA. The electrical command variable may be applied through the microprocessor. These valves 14,16 act to convert the control current into a control pressure for controlling the supply of pressurized air through air duct 11 within the position controller 8. The counter 22 is also connected to receive the control current and upon receipt thereof is caused to be activated, i.e. begin counting. The position controller 8 includes a sensor 18 which is connected to the spindle 2 through the distance indicator 7. This sensor 18 is able to determine when the spindle 2 begins its motion and transmits a signal through a connection line 24 to the counter 22 causing it to stop its count. The count registered by the counter is called the start-up time. The start-up time represents the interval between receipt of the control current and movement of the valve element 4 in response to the pressurized air, i.e., the time required to overcome the static frictional force and the gliding frictional force, and thus is related to the friction force imparted by the stuffing box 6 on the spindle 2. When the motion of the valve element 4 is stopped a signal is again imparted to the position controller 8 through input 12. This signal is applied to the valves 14,16 which convert the control current to a control pressure used to control the supply of pressurized air to the drive 1. This control current is also delivered to the counter 22 and causes the counter to begin decrementing the count obtained during the start-up time. When the sensor 18 senses that the spindle 2 has halted its motion it sends a signal to the counter 22 through line 24 which stops the decrementing of the counter 22. The time between receipt of the control current and the coming to rest of the spindle 2 and valve element 4 is called the stopping time. This time is related to the gliding frictional force exerted by the stuffing box 6 on the valve element 4 which causes the valve element to stop its motion. The decrementing of the counter value provides a difference interval equal to the difference between the start-up time and the stopping time. This difference interval relates to the static frictional force of the stuffing box 6 which the valve must overcome to begin motion. The counter value is then transmitted to the microprocessor 20 through a connection line 28. In the microprocessor 20, the difference value is related by calibration to a corresponding coefficient of friction value for the stuffing box 6. The coefficients of friction relating to particular difference intervals are stored in the microprocessor 20. Exact correlation of the actual difference interval to a coefficient value is determined by calibration.

The coefficients of friction of the value obtained in this manner may be effected by changes in air pressure applied to the drive 1 by the position controller 8. At a lower pressure it will take a longer amount of time to overcome the frictional force applied to the stuffing box. In order to eliminate errors caused by changing pressures supplied to the drive 1, the sensor 18 may also measure the distance at which the spindle 2 travels during the stopping time. In order to determine this distance the sensor 18 may include an incremental distance sensor or a potentiometer. The distance measured by the distance sensor is also dependent upon the frictional force exerted by the stuffing box 6 on the valve element 4, i.e. the larger the frictional force the shorter the distance moved by the valve element 4, but is unaffected by changes in air pressure. In order to determine when the distance is to be measured, the counter 22 may send a signal to the sensor 18 indicating that the stopping time has begun through the connection line 24. This signal would thus be sent when the counter 22 begins to decrement its value. This measured distance is then transmitted to the microprocessor 20 via connection line 26 wherein it is related by calibration to a corresponding coefficient of friction value of the stuffing box. The coefficient of friction values related to particular distances are stored within the microprocessor 20.

The two coefficient of friction values, one for the difference interval and the other for the distance travelled by the valve element 4 are then compared with each other. Based on this comparison one can determine whether a change in pressure has occurred in the system during operation of the valve. If the coefficient of friction values differ from one another the pressure has changed during operation. If it is determined that a change in pressure has occurred the microprocessor 20 will indicate such a change in pressure through an indicator 30, the coefficient of friction obtained by measuring the distance travelled is then compared with the coefficient of friction which is obtained prior to beginning operation of the valve and previously stored in the microprocessor. If it is determined that there has been no change in air pressure then either value may be compared with the coefficient of friction of the stuffing box 6 obtained prior to beginning operation of the valve as they are equal. If a difference exists between the stored coefficient value and the coefficient value which has just been measured a change in the friction of the stuffing box and thus a change in the condition of the seal has occurred. The microprocessor 20 will indicate such a change through an indicator 30. The microprocessor 10 thus acts to monitor the frictional force exerted by the stuffing box 6 based upon the stored coefficient of friction value.

Operation of the present invention will now be described with reference to the drawings.

In operation, reference values for the start-up time, the stopping time and the travel distance are obtained prior to operating the control valve. These parameters are measured in an autoconfiguration run. In the autoconfiguration run an electrical control current signal is supplied to the position controller 8. This signal is applied to both the counter 22 and the control valves 14,16. The signal may be applied to the control valves through the microprocessor 20. Upon receipt of the control current signal, the counter 22 begins its count and the valves 14,16 deliver pressurized air to the pneumatic drive 1. The pressurized air supplied to the pneumatic drive causes the pneumatic drive to place the valve element 4 in motion. In order to staff its motion, the valve element 4 must overcome the static frictional force in order to begin motion and a gliding frictional force to continue its motion applied by the stuffing box 6. Upon overcoming these two forces the sensor 18 senses the movement of the spindle 2 and the valve element 4 via its connection to the distance indicator 7 and delivers a signal to the counter 22 causing the counter to discontinue its counting. The interval measured by the counter is termed the start-up time. A second electrical control current signal is supplied to the position controller 8 to indicate when the valve element 4 should stop its motion and come to rest. This signal is sent to the counter 22 causing it to decrement the count obtained during the start-up time and also to the control valves 14,16 causing it to control the pressurized air delivered to the drive. When the valve element 4 comes to rest, the sensor 8 senses a lack of motion of the spindle 2 and sends a signal through connection line 24 to the counter 22 causing it to discontinue its decrementing of the count. This interval is termed the stopping time. In order to stop movement of the valve element 4 only the gliding frictional force must be overcome. Thus the start-up time will always be longer than the stopping time. Alternatively, the starting time and stopping time can also be measured using a counter for measuring each interval wherein the stopping interval or count is then subtracted from the start-up interval or count to determine the interval differential. The interval or count difference determined by either method is then transmitted to the microprocessor wherein it is related by calibration to the coefficient of friction value of the stuffing box corresponding to that time difference. The coefficient of friction values for the stuffing box are stored in the microprocessor.

During the stopping time the sensor 18 also measures the distance travelled by the spindle 2 and thus travelled by the valve element 4. The sensor 18 may be controlled by signals received from the counter to determine when to measure the distance travelled. This measurement is also delivered to the microprocessor 20 and is related by calibration to a coefficient of friction value of the stuffing box. These coefficient of friction values are likewise stored in the microprocessor. The coefficient of friction values determined for the difference interval and distance travelled are then stored in the microprocessor 20 for later comparison with values obtained during operation of the valve.

The control valve is then placed in operation with the position controller 8 controlling movement of the valve element 4 through the pneumatic drive 1. Whenever the position controller 8 acts to control the drive 1 thus placing the valve element 4 in motion, the start-up time is measured as described herein before. When the position controller 8 acts on the drive to stop motion of the valve element 4 both the stopping time and the travel distance are measured. The difference in time between the start-up time and the stopping time is then obtained and sent to the microprocessor 20 wherein it is related by correlation to a coefficient of friction value of the stuffing box 6. The travel distance is also sent to the microprocessor 20 wherein it is related by calibration to a coefficient of friction value of the stuffing box 6. These values are then compared in the microprocessor and if there is a difference between the values a change in pressure has occurred during the operation of the valve. If a change in pressure has occurred during operation of the valve an indicator 30 alerts that a change in pressure has occurred and the coefficient of friction obtained by calibration of the travel distance may then be compared with the travel distance coefficient of friction obtained during the autoconfiguration run which had been previously stored in the microprocessor to determine the condition of the seal. A discrepancy between these two values indicates that there has been a change in the stuffing box friction and thus a change in the condition of a seal and the indicator 30 will also indicate such a change. If there are no discrepancies between any of the variables obtained it is an indication that there has been no change in air pressure, and no change in the frictional force of the stuffing box 6 or in the condition of the dynamic seal.

It is thus evident that through the normal parameters measured during the operation of the control valve of the present invention one is able to constantly monitor the condition of the seal between the valve element and the valve chamber and also to monitor changes in air pressure occurring during operation of the valve. These conditions can be monitored using a control valve which consumes only a small amount of power because no additional pressure sensor is needed. The inventive device is also able to accurately monitor these conditions without being affected by varying parameters which may affect the accuracy of the measurements obtained. Monitoring is performed in both a ventilated and deventilated state and thus, measurements which are affected by air pressure and measurements which are unaffected by air pressure are obtained and compared. A difference between these measurements indicates that a change in air pressure has occurred during the operation of the valve.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

We claim:

1. In a control valve including a valve housing; a drive operated by a pressure medium; a position controller controlling operation of the drive through application of the pressure medium upon application of a control current to the position controller; a spindle extending from the drive and into the valve housing; a distance indicator coupled between the spindle and the position controller; a valve element positioned on an end of the spindle within the valve housing; and means for sealing the valve housing, the spindle extending into the valve housing through the sealing means and controlled to move into and out of the valve housing by the drive against a frictional force exerted by the sealing means; said position controller comprising:

means for sensing both application of the control current to said position controller and movement of said distance indicator, for measuring a first interval between a first application of the control current to said position controller and an initial movement of said distance indicator, for measuring a second interval between a second application of said control current to said position controller and a stop in movement of said distance indicator, and for determining a third interval defined by a difference between said first interval and said second interval;

means for receiving a signal representative of said third interval from said sensing means and for determining a first coefficient of friction value for the sealing means from said signal representing said third interval; and means for receiving said first coefficient of friction value from said determining means and for monitoring the frictional force exerted by the sealing means based upon said first coefficient of friction value.

2. The control valve as claimed in claim 1, wherein said position controller further includes:

means coupled to said distance indicator for measuring a distance travelled by the spindle during said second interval based upon movement of the distance indicator; and means for receiving said measured distance from said measuring means and determining a second coefficient of friction value for the sealing means based upon said measured distance.

3. The control valve as claimed in claim 2, wherein said position controller further includes means for comparing said first coefficient of friction value with said second coefficient of friction value and means for determining whether a change in pressure supplied to the drive by the pressure medium has occurred during operation of said control valve based upon said comparison.

4. A method of monitoring operating parameters in a control valve including a valve housing; a drive operated by a pressure medium; a position controller controlling operation of the drive through application of the pressure medium upon application of a control current to the position controller; a spindle extending from the drive and into the valve housing; a distance indicator coupled between the spindle and the position controller; a valve element positioned on an end of the spindle within the valve housing; and means for sealing the valve housing, the spindle extending into the valve housing through the sealing means and controlled to move within the valve housing by the drive, the method comprising the steps of:

(a) applying a first signal of the control current to the position controller;

(b) supplying the pressure medium to the drive in response to the receipt of the first signal;

(c) sensing movement of the valve element in response to the application of the pressure medium to the drive;

(d) measuring a first interval between application of the first signal in step (a) and movement of the valve element in step (c);

(e) applying a second signal of the control current to the position controller;

(f) sensing a stop of movement of the valve element in response to the application of the second signal;

(g) measuring a second interval between application of the second signal in step (e) and the stop of movement of the valve element in step (f);

(h) subtracting said second interval from said first interval to obtain a difference interval;

(i) determining a first coefficient of friction for the sealing means based upon the obtained difference interval;

(j) storing said coefficient of friction in a microprocessor;

(k) repeating said steps (a) through (i) to obtain a subsequent value of said first interval, second interval, difference interval and first coefficient of friction;

(l) comparing said stored first coefficient of friction value with said subsequent first coefficient of friction value to determine whether a change in condition of the sealing means has occurred.

5. The method as claimed in claim 4, further comprising steps of:

(m) measuring a distance travelled by the valve element during one of said second intervals;

(n) determining a second coefficient of friction for the sealing means based upon said measured distance;

(o) comparing said second coefficient of friction with said first coefficient of friction obtained during a corresponding one of said first intervals to determine whether there has been a change in the pressure exerted on the drive by the pressure medium.

* * * * *